(12) United States Patent
Holopainen et al.

(10) Patent No.: US 6,595,691 B1
(45) Date of Patent: Jul. 22, 2003

(54) ARRANGEMENT FOR RAPID MOVEMENT OF A ROLL WITH HYDROSTATIC BEARINGS

(75) Inventors: Kari Holopainen, Muurame (FI); Juha Lahtinen, Jyväskylä (FI); Pekka Kivioja, Muurame (FI); Juha Ehrola, Jyväskylä (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 09/719,943
(22) PCT Filed: May 28, 1999
(86) PCT No.: PCT/FI99/00465
§ 371 (c)(1), (2), (4) Date: Mar. 26, 2001
(87) PCT Pub. No.: WO99/66220
PCT Pub. Date: Dec. 23, 1999

(30) Foreign Application Priority Data

Jun. 15, 1998 (FI) .................................................. 981382

(51) Int. Cl.$^7$ ............................................. F16C 32/06
(52) U.S. Cl. ..................................... 384/100; 384/116
(58) Field of Search ........................... 384/100, 99, 108, 384/111, 114, 116, 117, 118; 100/170; 492/7

(56) References Cited

U.S. PATENT DOCUMENTS

| | | | |
|---|---|---|---|
| 3,909,080 A | * 9/1975 | Hallnor et al. .............. | 384/116 |
| 4,041,752 A | 8/1977 | Dolenc et al. | |
| 4,530,227 A | * 7/1985 | Schlatter et al. ............ | 384/116 |
| 5,022,318 A | * 6/1991 | Alich ......................... | 100/170 |
| 5,140,731 A | * 8/1992 | Brendel ....................... | 492/7 |
| 5,382,096 A | * 1/1995 | Stein et al. ................. | 384/100 |
| 5,509,883 A | 4/1996 | Niskanen et al. | |
| 6,012,386 A | * 1/2000 | Lahtinen et al. ............ | 100/170 |
| 6,129,453 A | * 10/2000 | Holopainen et al. ........ | 384/100 |

FOREIGN PATENT DOCUMENTS

WO     9836185     8/1998

* cited by examiner

Primary Examiner—Christopher P. Schwartz
Assistant Examiner—Melanie Torres
(74) Attorney, Agent, or Firm—Steinberg & Raskin, P.C.

(57) ABSTRACT

The invention relates to an arrangement for displacing a roll, which is hydrostatically journalled by its axle (1) on support structures and positionable in its working position by means of a bearing, through a rapid movement of the bearing out of its said working position. The journalling comprises at each end of the roll at least one loading element (2–4) pressurizable with a hydraulic medium and at least one support element (5). The arrangement of the invention comprises a valve control piston (9), delivering a hydraulic medium required for the pressurization of said at least one loading element (2) and positioned in a valve cylinder (8), said control piston (9) being provided with a positioning valve (10) on the face of the control piston (9) pointing towards the loading element (2), the face of the control piston (9) opposite relative to the positioning valve (10) being coupled with a pressure line (LP) of the hydraulic system for focusing a holding pressure on the control piston (9).

16 Claims, 3 Drawing Sheets

ARRANGEMENT FOR RAPID MOVEMENT OF A ROLL WITH HYDROSTATIC BEARINGS

FIELD OF THE INVENTION

The present invention relates to an arrangement for displacing a roll, which is hydrostatically journalled by its axle on support structures and positionable in its working position by means of a bearing, through a rapid movement of the bearing out of its said working position, said journalling comprising at each end of the roll at least one loading element pressurizable with a hydraulic medium and at least one support element. The invention is particularly suitable for the quick release of a roll nip constituted by two rolls, but it is by no means intended to be limited to just this particular application.

BACKGROUND OF THE INVENTION

The quick release of a roll nip is required for example with calenders using coated soft-surface rolls in the event of a web break for avoiding roll surface damages. Heretofore, the quick release of a roll nip has been effected by means of external loading cylinders by releasing from the cylinders a holding pressure which supports the bottom roll. In such a traditional design, the nip force progresses along a long route through the lower cylinders and the entire frame structure from bottom roll to top roll. The lower cylinders necessitate a set of valves and often the use of a separate individual aggregate. The Applicant's earlier Finnish patent application 970625 discloses a control system for the bearings of a hydrostatically journalled roll, which enables the execution of a quick action for the roll by means of the journalling. As a result of carrying out the quick release of a roll nip by means of a lower cylinder bearing, the lower cylinders included in the traditional design can be omitted and, if necessary, the configuration of calenders can be modified in such a way that the rolls are linked directly to each other by means of coupling elements present at the ends of the rolls. Thus, the coupling element transmits the nip force and the machine frame structures can be lightened and the loading system strengthened by virtue of a shorter transmission chain. The elimination of lower cylinders also results in a simpler control system.

OBJECTS AND SUMMARY OF THE INVENTION

One object of the present invention is to provide an improved arrangement for effecting a rapid movement for a hydrostatically journalled roll by means of a bearing. In order to achieve this objective, an arrangement of the invention is characterized in that the arrangement comprises a valve control piston, delivering a hydraulic medium required for the pressurization of said at least one loading element and positioned in a valve cylinder, said control piston being provided with a positioning valve on the face of the control piston pointing towards the loading element, the face of the control piston opposite relative to the positioning valve being coupled with a pressure line of the hydraulic system for focusing a holding pressure on the control piston.

A In another preferred embodiment of the invention, the arrangement further comprises a quick-action piston for effecting the rapid movement, positioned in a quick-action cylinder, one face of said piston being coupled with a pressure line for focusing a holding pressure on the piston, the opposite face of said piston being coupled with a quick-action pressure line extending to a pressurization side of said at least one loading element, and that, in order to effect a rapid movement of the bearing, the quick-action cylinder is adapted to remove a constant volume of hydraulic medium consistent with a desired rapid movement range from the pressurization side of said at least one loading element, while a holding pressure in the pressure line acting on said pistons has been released.

In yet another preferred embodiment of the invention, the pressure line for the valve cylinder and the quick-action cylinder is provided, in connection with each cylinder, with a holding valve which is adapted to open as a result of releasing the supply pressure of the pressure line, said opening of the holding valve releasing said holding pressure of the pistons.

The arrangement of the invention is suitable for use in a nip constituted by a deflection-compensated self-loading type roll and a counter roll provided with a stroke-effecting slide bearing of the invention.

BRIEF DESCRIPTION OF THE DRAWINGS

The invention will now be described in more detail with reference to the accompanying drawings, in which.

DETAILED DESCRIPTION OF THE INVENTION

Figure 1:
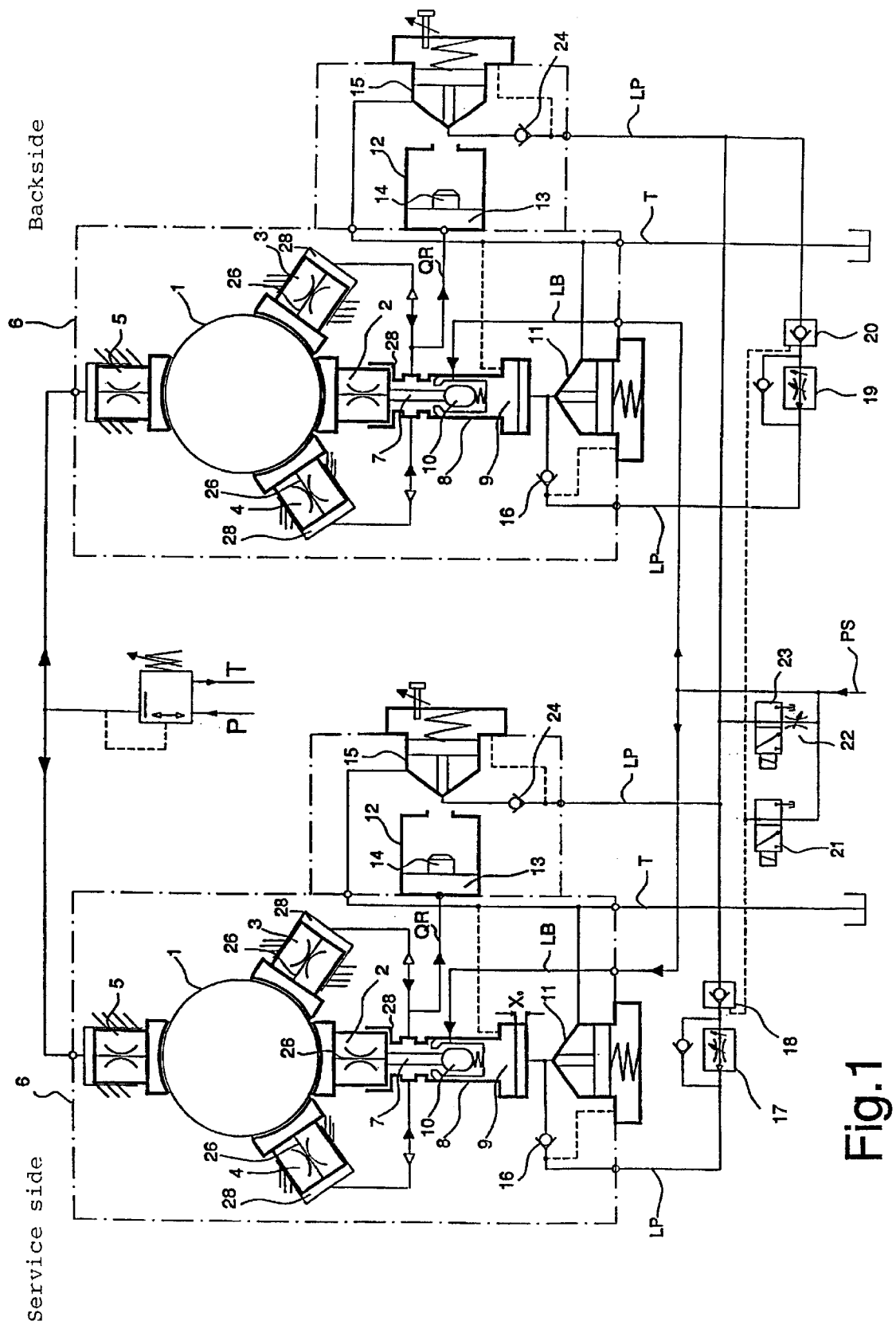
FIG. 1 shows in principle one arrangement of the invention in a schematic view.
Figure 2:
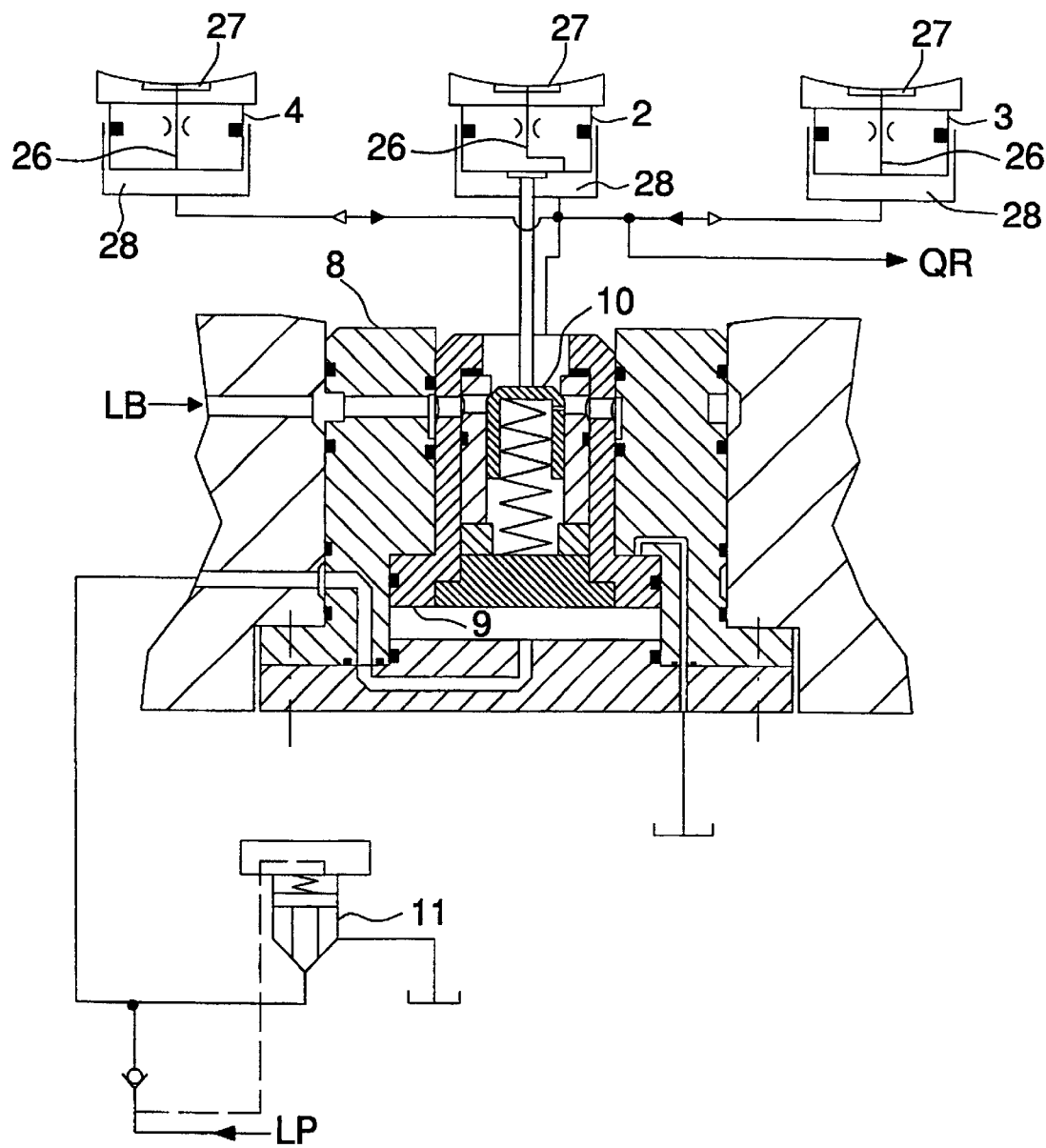
FIG. 2 shows a positioning valve included in the arrangement of FIG. 1, in a more detailed schematic view.

The diagram of principle shown in FIG. 1 for a control system according to one preferred embodiment of the invention represents a situation, wherein a hydrostatically journalled roll axle 1 is in a working position consistent with a loaded condition. The left side of the figure represents a roll end in the service side and the right side depicts a backside end. In the exemplary case of FIG. 1, the axle 1 is provided with a hydrostatic journalling which is implemented by using three hydraulic loading elements 2–4 as well as one hydraulic support element 5, the latter working in a direction essentially opposite to a principal loading direction established by the loading elements 2–4. In order to pressurize the hydraulic loading elements 2–4, a chamber space 28 therebelow is supplied with a hydraulic medium by means of a control piston 9 for a valve included in a valve cylinder 8 to be placed underneath the loading element 2, the bottom surface of said control piston 9 being subject to the action of a supply pressure existing as a holding pressure in a pressure line LP of the system. The control piston 9 is provided with a counter valve or positioning valve 10, which has assumed its top position in the working condition of a roll shown in FIGS. 1 and 2. The positioning valve 10 is back coupled with the position of the loading element 2 thereabove through the intermediary of a back-coupling rod 7, said rod being connected to the bottom surface of the loading element 2 and extending into the interior of the valve cylinder 8 against the top surface of the positioning valve 10. The opening or releasing of the positioning valve 10 complies with the nip load. As the load increases, the loading element 2 goes downwards, whereby the positioning valve 10 delivers more hydraulic medium and the increasing amount of hydraulic medium develops a higher pressure for compensating for the increased load. The position of the axle 1 can be changed by changing the position of the positioning valve 10. The pressure line LP leading to the valve cylinder 8 is provided with a holding valve designed as a cartridge valve 11, which is pressurized to a shut-off position by means of a supply pressure existing in the pressure line LP.

Figure 3:
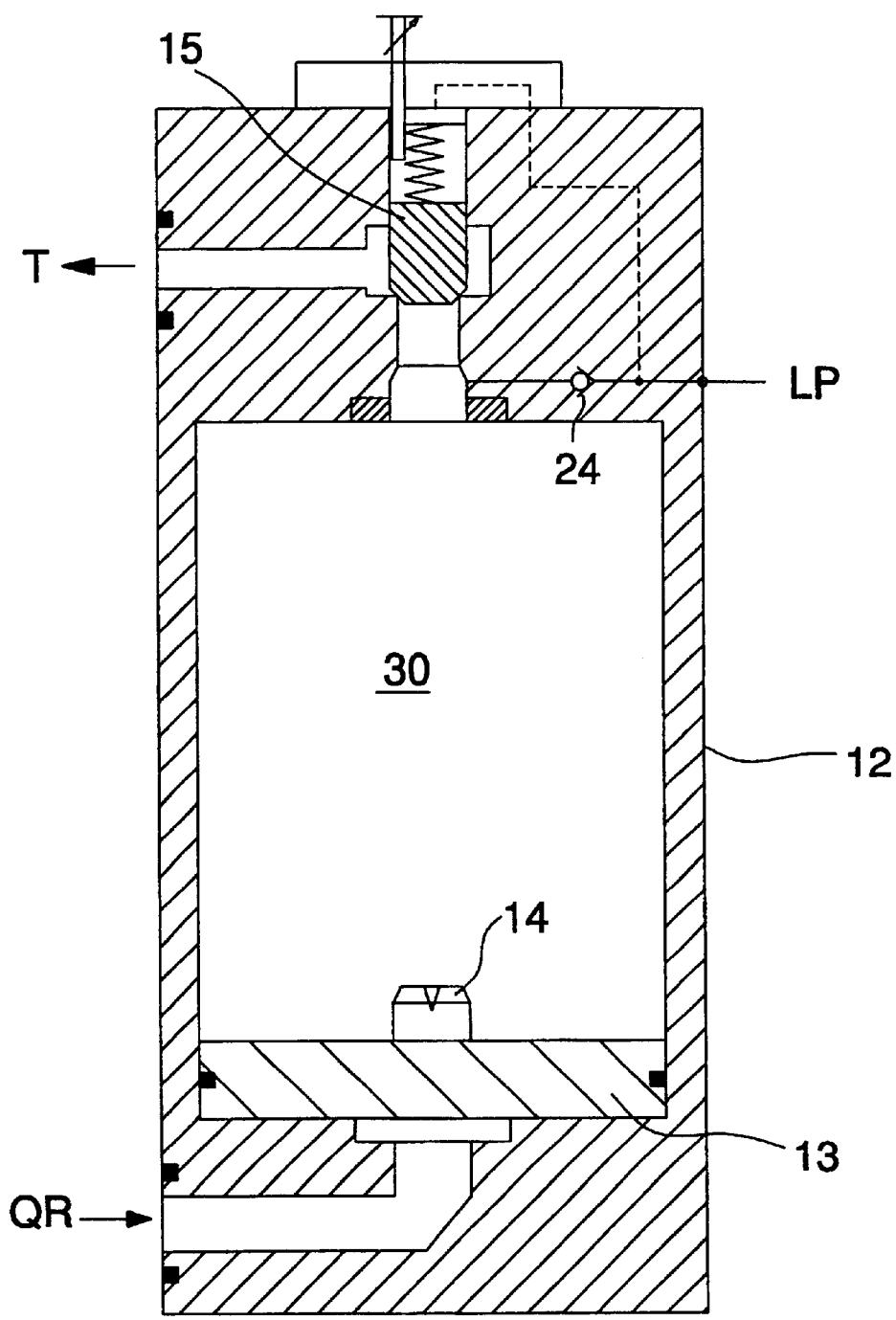
FIG. 3 shows a quick-action delivering cylinder included in the arrangement of FIG. 1, in a more detailed schematic view.

In order to effect a rapid movement of the bearing (a quick release of the roll nip), the chamber spaces 28 of the loading elements 2–4 are connected in the preferred embodiment of the invention shown in FIG. 1 with a quick-action cylinder 12 by way of a quick-action line QR for the hydraulic medium. In the condition of FIGS. 1 and 3, the quick-action cylinder 12 has its piston 13 pressurized by means of a holding pressure of the pressure line LP prevailing in a chamber 30 to its standby position (to its extreme left-hand position in FIG. 1). In connection with the quick-action cylinder 12 is provided a holding valve 15 designed as a cartridge valve, which is pressurized to a shut-off position by means of the supply pressure of the pressure line LP.

In order to effect the rapid movement of the bearing, the holding pressure is released simultaneously from the chamber of the piston 9 of the loading cylinder 8 and that of the piston 13 of the quick-action cylinder 12 closer to the pressure line LP. The pressure is released by means of a valve 23 connected to a main supply line PS, which removes the supply pressure shutting off the cartridge valves 11 and 15. The quick-action piston 13 sets off and removes from the pressurizing chambers of the loading elements 2–4 a constant volume of pressure medium consistent with a desired rapid movement stroke, which is determined by the dimensions of the quick-action cylinder 12. The speed of the rapid movement is regulated by throttling the opening of the cartridge valve 15. The amount of oil departing from the quick-action cylinder is guided by way of a valve housing 6 to a main return line T of the system. The quick-action piston 13 has its movement subdued by means of an outflow-throttling conic journal 14 present at the end of the piston.

The rapid movement terminates as the quick-action piston 13 reaches the bottom. The control piston 9 of the valve cylinder 8 continues to move and the oil running away from underneath the loading elements 2-4 flows by way of capillaries 26 into bearing pockets 27 and further into a bearing housing 6, whereby the motion of the elements is subdued in a controlled fashion. The displacement of the control piston 9 is used for determining a desired displacement for the axle 1, which is consistent with the nip gap.

One benefit gained by the arrangement of the invention is that the lubrication flow, a line LB, is not cut off at any point of the action cycle. The lubrication flow may only be cut off momentarily, if the control valve 10 loses its contact with the back-coupling rod 7 of the loading element 2.

The hoisting of a roll back to its working position, i.e. a position consistent with a loaded condition, is carried out as follows. The hoisting of the axle 1 is preceded by shifting the quick-action pistons 13 (both on service side and backside) to a standby position. A shift to the standby position is always performed with the axle 1 in a lowered position.

There are controlled counter-valves 18 and 20 for blocking the movement of the control pistons 9 and for shifting the quick-action pistons 13 first to a standby position (the extreme left-hand position in FIG. 1). The action speed of the pistons 13 is regulated by means of a throttle 22. As the pistons 13 are moving, the pressure medium flows from the quick-action chambers closer to the loading elements 2–4 through the loading elements into the bearing housings 6. During the action of the pistons 13 the position of the axle 1 may change, but the axle returns back to a lowered position as the action is completed. The completion of the action can be indicated by means of a pressure existing in the pressure line LP (by the time the pressure has risen to a constant value, the pistons have reached a standby position).

After reaching the standby position for the quick-action pistons 13, the controlled counter-valves 18 and 20 are opened by means of a valve 21, thus allowing the pressure medium to flow through flow control valves 17 and 19 into the spaces closer to the pressure line LP of the control pistons 9. The annular areas of the control pistons 9 are released by way of the bearing housing 6 into a tank channel T. The hoisting speed and the synchronism of the action on both backside and service side are controlled by the valves 17 and 19.

When the roll is in its working position, the nip is closed with a self-loading counter roll and the force balance is established by the positioning valve 10.

In a pressurizing chamber 29 for support elements 5 present on the opposite side relative to the loading elements 2-4 there prevails a constant pressure in all operating conditions.

The relationship between the displacement of the loading elements 24 and that of the quick-action piston 13 is determined by hydraulic gear ratio, i.e. the ratio of surface areas. The movement of the quick-action piston 13 is subdued at the end of a stroke by means of the conic journal 14 present at the bottom of the piston 13. At the same time, this cushions the sudden stop of a journalled axle. Furthermore, the latter part of the axle movement is cushioned as the pressure medium is flowing through the capillaries 26 out of the bearing.

In the most preferred embodiment of the invention described above with reference to FIGS. 1–3, the pressure line LP leading to the valve cylinder 8 is provided with a cartridge valve 11 and with the chamber spaces 28 of the loading elements 2–4 is connected a quick-action cylinder 12 which is fitted with a cartridge valve 15. This solution enables a quicker unloading for the capillaries of the loading elements 3 and 4. The discussed solution is particularly beneficial in connection with a soft calender, wherein the closing of a nip is effected by using a self-loading type counter roll. However, the invention is conceivable even without the quick-action cylinder 12 and the cartridge valves 11 and 15, whereby, in the arrangement of the invention, the valve assembly includes the valve cylinder 8 provided with the valve control piston 9 located below the positioning valve 10. In one alternative, the valve assembly includes the valve cylinder 8, the positioning valve 10, the control piston 9, and the cartridge valve 11 connected to the valve cylinder 8.

In the following, the patent claims will be given, and the various details of the invention can show variation within the scope of the inventive idea defined in the claims and differ even to a considerable extent from the details stated above by way of example only. As such, the examples provided above are not meant to be exclusive and many other variations of the present invention would be obvious to those skilled in the art, and are contemplated to be within the scope of the appended claims.

What is claimed is:

1. An arrangement for displacing a roll, which is hydrostatically journalled by its axle (1) on support structures and positionable in its working position by means of a bearing, through a rapid movement of the bearing out of its said working position, said journalling comprising at each end of the roll at least one loading element (2–4) pressurizable with a hydraulic medium and at least one support element (5), wherein the arrangement comprises a valve control piston (9), delivering a hydraulic medium required for the pressurization of said at least one loading element (2) and positioned in a valve cylinder (8), said control piston (9) being provided with a positioning valve (10) on the face of the control piston (9) pointing towards the loading element (2), the face of the control piston (9) opposite relative to the positioning valve (10) being coupled with a pressure line (LP) of the hydraulic system for focusing a holding pressure on the control piston (9), and a quick-action piston (13) for effecting the rapid movement, positioned in a quick-action cylinder (12), one face of said quick-action piston (13) being coupled with the pressure line (LP) for focusing a holding pressure on said quick-action piston (13), the opposite face of said quick-action piston being coupled with a quick-action pressure line (QR) extending to a pressurization side (28) of said at least one loading element, and that, in order to effect a rapid movement of the bearing, the quick-action cylinder (12) is adapted to remove a constant volume of hydraulic medium consistent with a desired rapid movement range from the pressurization side (28) of said at least one loading element (2), while a holding pressure in the pressure line (LP) acting on said pistons (9, 13) has been released.

2. An arrangement as set forth in claim 1, wherein the pressure line (LP) for the value cylinder (8) and the quick-action cylinder (12) is provided, in connection with each cylinder, with a holding valve (11 and 15, respectively) which is adapted to open as a result of releasing the supply pressure of the pressure line (LP), said opening of the holding valve releasing said holding pressure of the pistons (9, 13).

3. An arrangement as set forth in claim 2, wherein said holding valve comprises a cartridge valve (11 and 15, respectively).

4. An arrangement as set forth in claim 1, wherein the hydraulic system is adapted to secure a lubricant flow (LB) for the loading elements (2–4) at all stages of the operating cycle.

5. An arrangement as set forth in claim 1, wherein the roll comprises a roll which, together with a counter roll, constitutes a paper machine nip, the rapid movement being intended to achieve a quick release or opening of said nip.

6. An arrangement as set forth in claim 5, wherein the roll comprises a soft calender roll.

7. An arrangement for displacing a roll, which is hydrostatically journalled by its axle (1) on support structures and positionable in its working position by means of a bearings through a rapid movement of the bearing out of its said working position, said journalling comprising at each end of the roll at least one loading element (2–4) pressurizable with a hydraulic medium and at least one support element (5), wherein the arrangement comprises a valve control piston (9), delivering a hydraulic medium required for the pressurization of said at least one loading element (2) and positioned in a valve cylinder (8), said control piston (9) being provided with a positioning valve (10) on the face of the control piston (9) pointing towards the loading element (2), the face of the control piston (9) opposite relative to the positioning valve (10) being coupled with a pressure line (LP) of the hydraulic system for focusing a holding pressure on the control piston (9); is included in the control piston (9) for the valve cylinder (8) and wherein the positioning valve (10) is operatively coupled to a back surface of the loading element (2).

8. An arrangement as set forth in claim 7, wherein the positioning valve (10) is operatively coupled with the loading element (2) by means of a back-coupling rod (7).

9. An arrangement for displacing a roll, comprising:

a roll having a hydrostatically journalled axle structured and arranged to be supported by a plurality of support structures at a first end and a second end thereof, said hydrostatically journalled axle having at least one loading element at each of said first and second end thereof; each of said at least one loading element being pressurizable with a hydraulic medium on a pressurization side thereof; said at least one loading element being structured and arranged to exert a loading in a principle direction on said axle;

at least one support element structured and arranged to exert a load on said roll in a direction opposite to said principle direction;

bearing means for positioning said roll between a working position in which said roll is loaded in said principle direction and a non-working position in which said roll is unloaded;

at least one valve control piston/cylinder assembly having a first face substantially directed toward said at least one loading element and a second face opposite said first face; said at least one valve control piston/cylinder assembly operatively coupled to a corresponding one of said at least one loading element, whereby said at least one valve control piston/cylinder assembly delivers said hydraulic medium to said at least one loading element; said at least one valve control piston/cylinder assembly having a positioning valve operatively coupled to said first face thereof; and a holding pressure line operatively coupled to said second face of said control piston; said pressure line being structured and arranged for transmitting a holding pressure from a hydraulic system to said at least one valve control piston/cylinder assembly;

a quick-action piston/cylinder assembly structured and arranged to produce a rapid movement of said bearing means from said working position to said non-working position; said quick-action piston/cylinder assembly having a first face and a second face opposite said first face; wherein said first face is operatively coupled to said holding pressure line and wherein said second face is operatively coupled to a first end of a quick-action pressure line, a second end of said quick-action pressure line extending to said pressurization side of each of said at least one loading element, whereby when said holding pressure in said pressure line is released said quick-action piston/cylinder assembly removes a constant volume of said hydraulic medium, consistent with a desired rapid movement range, from said pressurization side of each of said at least one loading element, thereby effectuating said rapid movement of said bearing.

10. The arrangement as claimed in claim 9, wherein said pressure line further comprises:

at least one holding valve operatively coupled thereto; wherein said at least one holding valve is structured and arranged to open when a supply pressure of said pressure line is released and to release said holding pressure of said valve control piston/cylinder assembly and said quick-action piston/cylinder assembly when said holding valve is opened.

11. The arrangement as claimed in claim 10, wherein said holding valve comprises at least one cartridge valve.

12. The arrangement as claimed in claim 9, wherein said hydraulic system is structured and arranged to ensure a lubricant flow for said loading elements during all stages of an operating cycle.

13. The arrangement as claimed in claim 9, further comprising:
- a counter roll; wherein said roll and said counter roll define a paper machine nip; whereby a movement of said bearing means from said working position to said non-working position results in a quick release or opening of said nip.

14. The arrangement as claimed in claim 13, wherein said roll is a soft calender roll.

15. An arrangement for displacing a roll, comprising:
- a roll having a hydrostatically journalled axle structured and arranged to be supported by a plurality of support structures at a first end and a second end thereof; said hydrostatically journalled axle having at least one loading element at each of said first and second end thereof; each of said at least one loading element being pressurizable with a hydraulic medium on a pressurization side thereof; said at least one loading element being structured and arranged to exert a loading in a principle direction on said axle;
- at least one support element structured and arranged to exert a load on said roll in a direction opposite to said principle direction;
- bearing means for positioning said roll between a working position in which said roll is loaded in said principle direction and a non-working position in which said roll is unloaded;
- at least one valve control piston/cylinder assembly having a first face substantially directed toward said at least one loading element and a second face opposite said first face; said at least one valve control piston/cylinder assembly operatively coupled to a corresponding one of said at least one loading element, whereby said at least one valve control piston/cylinder assembly delivers said hydraulic medium to said at least one loading element; said at least one valve control piston/cylinder assembly having a positioning valve operatively coupled to said first face thereof; and
- a holding pressure line operatively coupled to said second face of said control piston; said pressure line being structured and arranged for transmitting a holding pressure from a hydraulic system to said at least one valve control piston/cylinder assembly;
- wherein said positioning valve is operatively coupled to a back surface of at least one of said loading elements.

16. The arrangement as claimed in claim 15, wherein a back-coupling rod is structured and arranged to interconnect said back surface of said at least one of said loading elements which is closest to said valve control piston/cylinder assembly.

* * * * *